(12) United States Patent
Mutters et al.

(10) Patent No.: US 6,734,973 B1
(45) Date of Patent: May 11, 2004

(54) METHOD AND APPARATUS FOR DETERMINING PLANT NUTRIENT STATUS

(75) Inventors: Randall G. Mutters, Chico, CA (US); James W. Eckert, Chico, CA (US)

(73) Assignee: The Regents of the University of California, Oakland, CA (US)

( * ) Notice: Subject to any disclaimer, the term of this patent is extended or adjusted under 35 U.S.C. 154(b) by 429 days.

(21) Appl. No.: 09/778,595

(22) Filed: Feb. 6, 2001

(51) Int. Cl.$^7$ .................................................. G01J 3/52
(52) U.S. Cl. ........................................ 356/421; 356/422
(58) Field of Search .................................. 356/421, 422; 382/110, 164; 348/144; 47/58.1

(56) References Cited

U.S. PATENT DOCUMENTS

| | | | |
|---|---|---|---|
| 4,126,417 A | | 11/1978 | Edwards |
| 4,227,211 A | | 10/1980 | Disbrow |
| 4,523,852 A | | 6/1985 | Bauer |
| 4,527,895 A | * | 7/1985 | Rubin ........................ 356/30 |
| 5,470,750 A | * | 11/1995 | Bar-Or ........................ 436/63 |
| 5,575,107 A | | 11/1996 | Doerr |
| 5,764,819 A | | 6/1998 | Orr et al. |
| 5,999,650 A | | 12/1999 | Ligon |
| 6,160,902 A | | 12/2000 | Dickson et al. |
| 6,178,253 B1 | * | 1/2001 | Hendrickson et al. ...... 382/110 |

OTHER PUBLICATIONS

Leaf Color Chart, Maligaya, Munoz, Philippine Rice Research Institute, pp. 1–3, (1999) as provided by the applicant.*

Leaf Color Chart, http://www.philrice.net/publications/lcc/index.htm, Phillippine Rice Research Institute, pp. 1–3, (1999).

TropRice, Nutrient Management in Rice, Introduction: Leaf Color Chart (LCC): A simple tool to manage nitrogen fertilizer in tropical rice, http://cgiar.org/irri/Troprice/Nutrient%20management.htm, pp. 1–18, undated.

* cited by examiner

*Primary Examiner*—Russell Adams
*Assistant Examiner*—Andrew Sever
(74) *Attorney, Agent, or Firm*—John P. O'Banion

(57) ABSTRACT

A leaf color chart, calibration table and assessment chart and method for determining the nutrient status of a field crop such as rice. The leaf color chart has a palette of colored panels held within a planar support structure that have the same spectral reflectance characteristics as exhibited by a plant. In one embodiment the colors of the panels are defined by red-green (a*) and blue-yellow chromaticity (b*) and luminescence (L*) variables and are partitioned according to intervals in the blue-yellow scale. The calibration table is an array of percent nutrient values indexed according to the color panels of the leaf chart and the variety of plant. The assessment chart includes a graph of nutrient level values from the calibration table compared to the plant growth stage for various plant varieties and indicates the status of the crop as being deficient, adequate, critical or excessive.

30 Claims, 6 Drawing Sheets

| Plant Growth Stage | Nitrogen (% Total N) | | Days After Planting Approximate times. May vary between seasons. | | |
| --- | --- | --- | --- | --- | --- |
| | Critical | Adequate | Very early (e.g. M103) | Early (e.g. M202) | Late (e.g. M401) |
| Mid-tillering | 4.6 | 4.6-5.2 | 40 | 40 | 45 |
| Maximum Tillering | 4.0 | 4.0-4.6 | 50 | 55 | 70 |
| Panicle Initiation | 3.3 | 3.3-3.8 | 50-55 | 55-65 | 70-80 |
| Flag Leaf | 2.6 | 2.6-3.2 | 85 | 95 | 110 |

FIG. 6

METHOD AND APPARATUS FOR DETERMINING PLANT NUTRIENT STATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to plant fitness analysis, and more particularly to an apparatus and method for assessing plant nutrient needs by visually distinguishing color values from a color chart, calibrating a nutrient percentage according to plant variety, and assessing nutrient need according to the current position in the growth cycle. The user can thereby quantify the need and amount of soil supplements to avoid under or over-fertilization and maximize yields.

2. Description of the Background Art

The agriculture industry typically operates on relatively low profit margins and such profits may be lost by low crop yields. Low crop yields are particularly devastating to farmers in third world countries. Maximum crop yields may only be achieved through the regular monitoring of plant growing conditions throughout the growing cycle of the crop. Accurate monitoring of crop conditions allows the grower to adjust and plan for the application of fertilizer, schedule irrigation, identify the need for pesticides, estimate yields, and identify problems with planting.

Estimating tissue nitrogen (N) status at critical points of the life cycle of a plant can greatly improve the economics of agricultural plant production. For example, with rice and other grains, adequate levels of nitrogen are particularly critical during the onset of the reproductive phase. Kernel sizes, as well as the number of kernels per head, are sensitive to nitrogen levels in the plant.

Fertilizer applied during the early stages of the growth cycle may stimulate slower growing crops to reach normal levels of growth by the end of the growing cycle. However, excessive amounts of nitrogen fertilizer may actually reduce the quality and yield of certain crops. The excessive application of fertilizer may also result in contamination of waterways from irrigation runoff resulting in unwanted environmental effects. Furthermore, the untimely application of insufficient amounts of nitrogen fertilizer will have no appreciable effect on crop yield and is an additional uncompensated cost to the grower. Accordingly, the proper timing and amount of supplemental fertilizer to be applied to a crop is essential for optimum crop development and production efficiency.

The nitrogen levels in the most recently expanded leaf of rice, for example, have been shown to be a reliable indicator of the overall plant nutrient status. Once a nitrogen deficiency is identified, a grower needs to know the incremental increase in leaf nitrogen needed for optimum growth and the quantity of nitrogen fertilizer to be applied to achieve that increase. The grower must often estimate the actual amount of fertilizer that should be applied to the crop that is needed to raise leaf nitrogen into the adequate range. This invariably leads to the application of inadequate or excessive amounts of fertilizer during the growing cycle of the particular crop. In addition, the time interval during the reproductive phase where nitrogen fertilization is the most efficient is very short, often only a few days. Thus to be effective a grower must evaluate a large number of plants over the acreage and make management decisions within a short period of time.

Early methods for ascertaining the nitrogen content of a crop required the chemical analysis of the plants and the soil in a laboratory setting. The grower was required to take multiple samples, categorize and account for the samples, and submit the samples to a laboratory for testing. This process was time consuming and the delay in obtaining lab results often resulted in the grower missing the opportunity to apply fertilizer in a timely manner within the growing cycle of the plant.

Later, research on rice and other plant species demonstrated that leaf reflectance spectra could reliably predict leaf nitrogen concentration. Aerial and satellite photographs of the fields were utilized and compared with fields that had sufficient nitrogen. However, the satellite and aerial photographs provided limited information due to the low resolution of the photographs. The cost and the delay that occurs in taking and developing the photographs prohibited frequent use of the technique to monitor nitrogen during the growth cycle of the crops. Furthermore, the instrumentation used to measure color was not suitable for on-farm use, and predictive reflectance wavelengths were frequently outside of the visible range. Such techniques were also not available to the third world farmer.

Hand held chlorophyll meters, such as the Model SPAD-1504 made by Minolta Ltd., were developed to estimate leaf nitrogen, but these instruments are costly and require extensive sampling for accurate calibration before they are useful. In addition, these machines are prohibitively expensive and therefore unavailable to the third world grower.

Generalized color charts with various shades of green paint were developed for rice crops. However, the colors of these charts did not have the spectral reflectance characteristics of the plant nor were the colors correlated with a nutrient percentage, the plant growth cycle or a particular variety of rice.

Thus, a need exists for a reliable method of accurately determining the levels of nitrogen and other nutrients in crops that is immediate, inexpensive and easy to use. Furthermore, there is a need for a method of accurately predicting the amount of fertilizer that should be applied to a field that can be used daily and provide real time recommendations. The present invention satisfies those needs, as well as others, and overcomes the deficiencies of previous analytical apparatus and methods.

BRIEF SUMMARY OF THE INVENTION

The present invention is a method and apparatus for determining the nitrogen status of a field crop such as rice. The apparatus comprises a leaf color chart, a calibration table, and an assessment chart.

The leaf color chart comprises a planar, rectangular, plastic support structure that carries a palette of eight different color cells with each cell having a different shade of green. The shades of green have been chosen such that they correlate to nitrogen content in the plant and have been developed through careful examination of the spectral characteristics of the plant leaf at different nitrogen states. The color cells have been configured to have virtually the same spectral reflectance characteristics as observed in certain plants. A marginal portion along the longitudinal edge of the plastic color chart is preferably removed to facilitate direct visual comparison between the crop and color panels.

The leaf color chart may be configured to have the specific spectral reflectance characteristics of a particular plant type such as rice or can be adapted to non-agricultural applications wherever a visual comparison of colors is required. While rice is used herein as an example of one embodiment of the invention, it will be understood by those skilled in the art that the invention can be adapted to grasses and plants other than rice.

The color of each cell of the leaf color chart is preferably determined by obtaining reflectance characteristics of the plant at different nitrogen levels that are described in three-dimensional color space having a luminescence coordinate (L), a red to green scale coordinate (a*) and a blue to yellow scale coordinate (b*). Spectral reflectance characteristics are preferably obtained over the visible spectrum of approximately 400 nm to approximately 700 nm in approximately 10 nm increments. This creates a spectral profile of the plant. The spectral characteristics of the fabricated color cells are preferably tested repeatedly to ensure that leaf color is accurately described. Additionally, the leaf samples are preferably chemically analyzed for total nitrogen content.

The calibration table comprises an array of nitrogen or other nutrient level entries, the columns of which are indexed according to a unique identifying number associated with each color cell, and the rows of which are indexed by the variety of rice or other plant type. Use of the calibration chart provides a leaf nitrogen level value in percent. A separate calibration table is preferably provided for each nutrient such as potassium, magnesium, phosphorous nitrogen and the like.

The assessment chart comprises a graph of nitrogen status based on the leaf nitrogen level value derived from the calibration chart compared to the plant growth stage for the subject plant variety. Various color shades on the chart indicate the nitrogen status of the crop, as being adequate, critical, deficient, or excessive. Like assessment charts are provided for other nutrients of interest.

According to the invention, a sample leaf is taken from the field and placed on the leaf color chart panel that has substantially the same color as the leaf. The leaf chart panel number is then matched to the variety calibration chart to determine the nitrogen percent value for the leaf for the variety of plant. A nitrogen assessment is obtained by placing the percent nitrogen value on an assessment chart at a point determined by the stage of growth of a particular plant variety. The percent nitrogen is then assessed as adequate, critical, deficient or excessive, thereby allowing decisions to be made regarding fertilization.

An object of the invention is to provide a method of analyzing the nitrogen or other nutrient content of a crop that provides relevant data in real time and accurately identifies the quantities of fertilizer necessary to optimize the growth of the crop.

Another object of the invention is to provide a method for identifying nitrogen ad other nutrient needs and fertilizer quantities that is easy to use and can be used on a daily basis throughout the growing cycle of the crop.

Another object of the invention is to provide a color chart that has essentially the same spectral reflectivity as the crop at various nitrogen states.

Yet another object of the invention is to provide a method for accurately correlating spectral reflectance data with fertilizer needs that is inexpensive to manufacture and use.

A further object of the invention is to provide a method of creating a color chart that can be tailored to a particular plant type.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings that are for illustrative purposes only:

FIG. 6 is a table depicting critical and adequate ranges of total leaf nitrogen based on plant growth stages according to the present invention.

DETAILED DESCRIPTION OF THE INVENTION

Referring more specifically to the drawings, for illustrative purposes the present invention is embodied in the apparatus and method generally shown in FIG. 1 through FIG. 6, where like reference numbers denote like parts. It will be appreciated that the apparatus of the invention may vary as to configuration and as to details of the parts and that the method may vary as to specific steps and their sequence without departing from the basic inventive concepts disclosed herein.

By way of additional background, the levels of nitrogen in a plant have been found to be correlated to the reflectance of the plant in characteristic wavelengths in the light spectrum, particularly in the green and near infrared wavelengths as well as the yellow-blue wavelengths. Therefore, the observed spectral reflectance of a field crop may be used to determine nitrogen levels in the crop and calculate the amount of fertilizer to be applied to bring the nutrient level of the plant to optimum levels. Similarly, characteristic spectral reflectance may be used to correlate levels of other nutrients such as potassium, phosphorous and magnesium etc.

Figure 1:
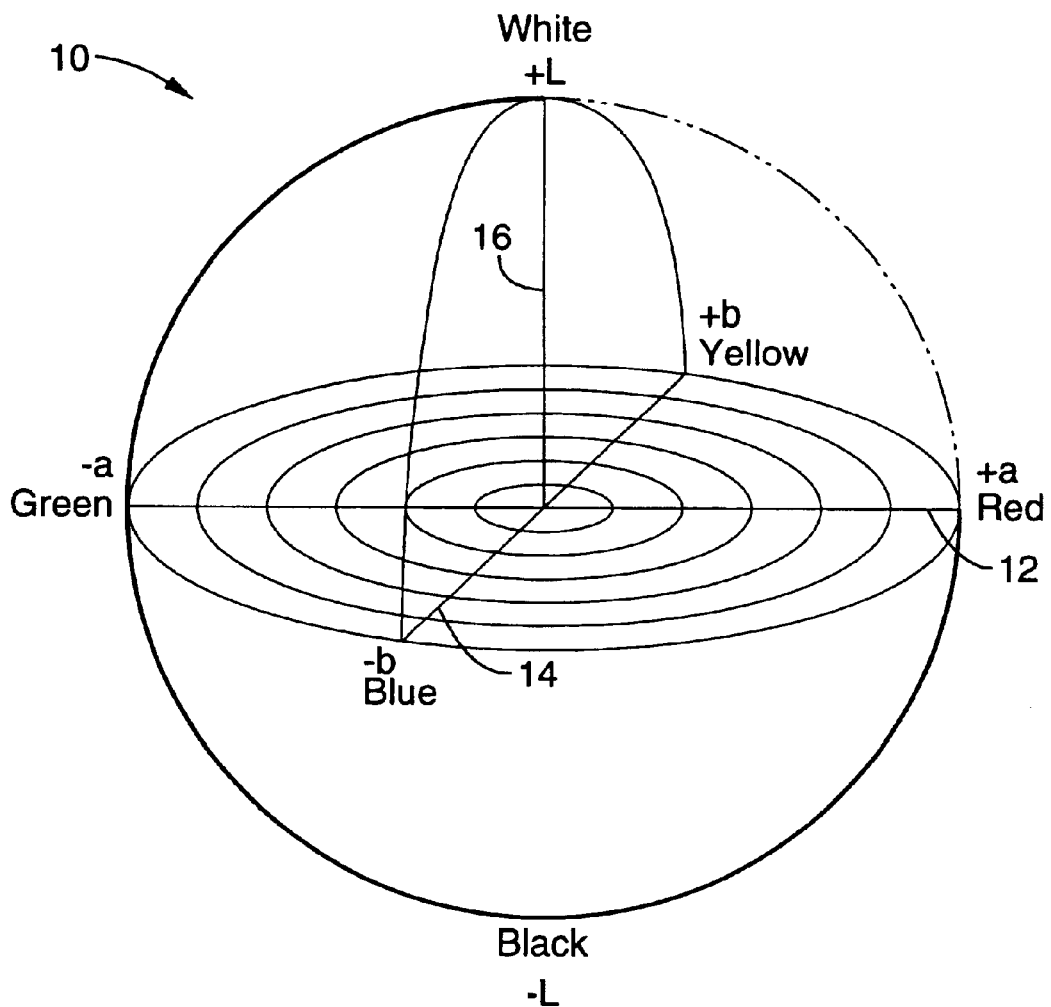
FIG. 1 is a three dimensional representation of the red to green and yellow to blue chromaticity coordinates according to the present invention.

Referring first to FIG. 1, a three-dimensional model 10 for defining color is generally shown. The color of an object can be depicted using a three variable equation. A color system using two chromaticity coordinates (a*) representing the red-green separations 12 and (b*) representing the yellow-blue separations 14 and a luminescence or lightness coordinate (L*) 16 is preferred. In this color system, L* represents the lightness coordinate 16 which is a measure of the intensity of a hue at saturation values of colors at the red-green (a*) and yellow-blue (b*) chromaticity coordinates 12, 14. The (L*)(a*)(b*) color system is preferred because it more closely matches the color perception characteristics of the human eye.

Figure 2:
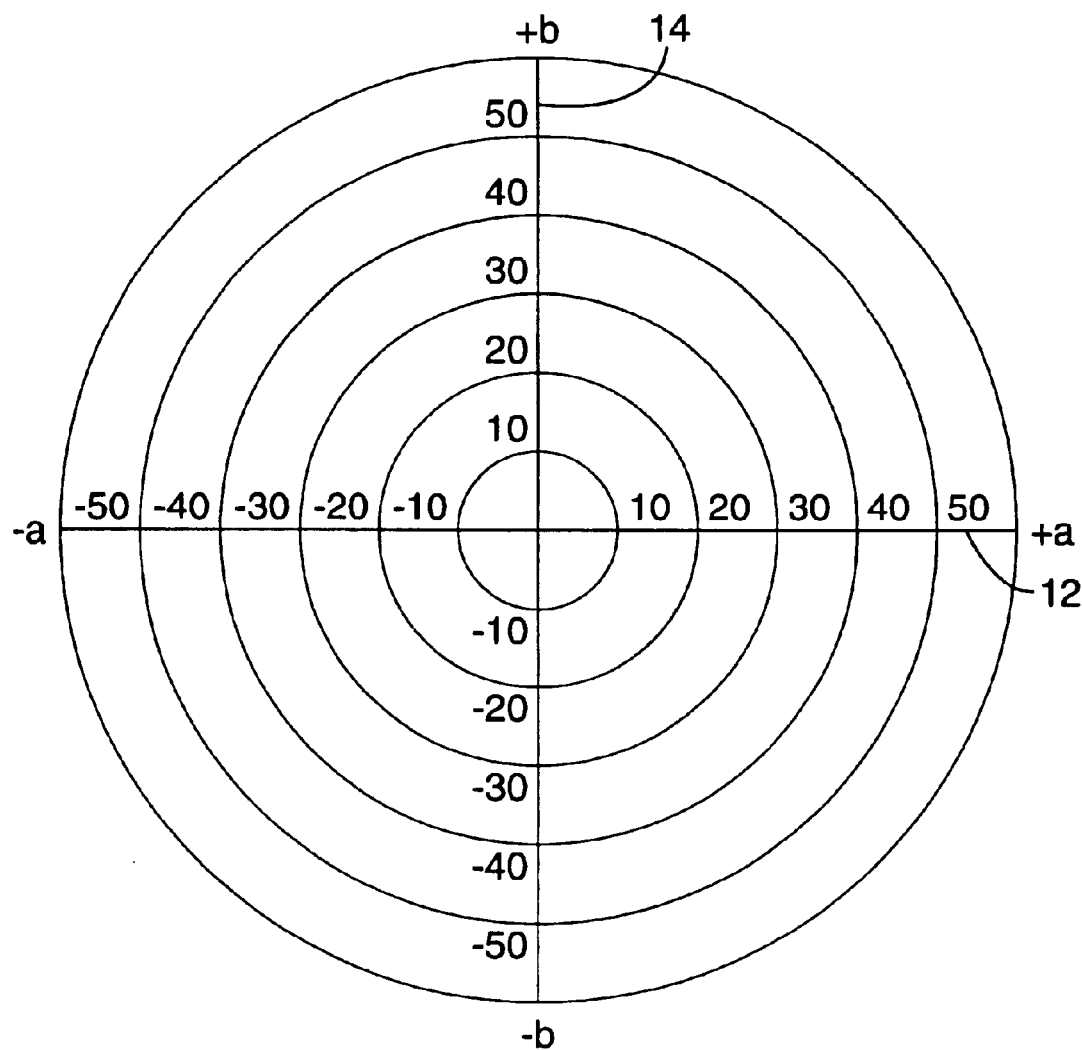
FIG. 2 is a two dimensional representation of the red to green and yellow to blue chromaticity coordinates according to the present invention.

Referring also to FIG. 2, a unique color of a subject plant leaf can be derived by obtaining a reflectance value on the red-green scale (a*), a reflectance value on the yellow blue scale (b*) and then determining the intensity of the hue (L*) along a gradient from light to dark resulting in a total reflectance value.

In FIG. 2, plotted values for (a*) and (b*) give a combined color representation. The chromaticity coordinate (+a*) represents a shift in the red direction and (-a*) represents a shift in the green direction. Likewise, chromaticity coordinate (+b*) represents a shift in the yellow direction and (-b*) represents a shift in the blue direction. The addition of light intensity (L*) to these coordinates provides the preferred three-dimensional spectral profile of the color. Differences in light and color values for each variable allow the calculation of color gradients unique to individual plant leaves at various nitrogen or other nutrient levels.

Additionally, colors of the leaf may be described using the numbers corresponding to either the entire visible spectrum or, preferably, more precise discrete intervals (e.g. approximately 10 nm) to provide better resolution. Color panels are preferably constructed based on the gradients in these descriptive variables across the visible light spectrum (approximately 400 nm to approximately 700 nm) partitioned into approximately 10 nm intervals providing a spectral profile. In other words, reflectance value describing every 10 nm increment of the visible spectrum are preferably obtained. While 10 nm intervals were selected for purposes of illustration, it will be understood by those skilled in the art that any desired interval and spectrum range could selected.

Reflectance patterns of rice leaves over the range of wavelengths in the visible spectrum show a distinct peak at around 550 nm and a characteristic "red tail" near the 700 nm wavelength. The color panels of the leaf color chart of the present invention accurately display the same characteristic reflectance peaks seen in the plant leaves.

Figure 3:
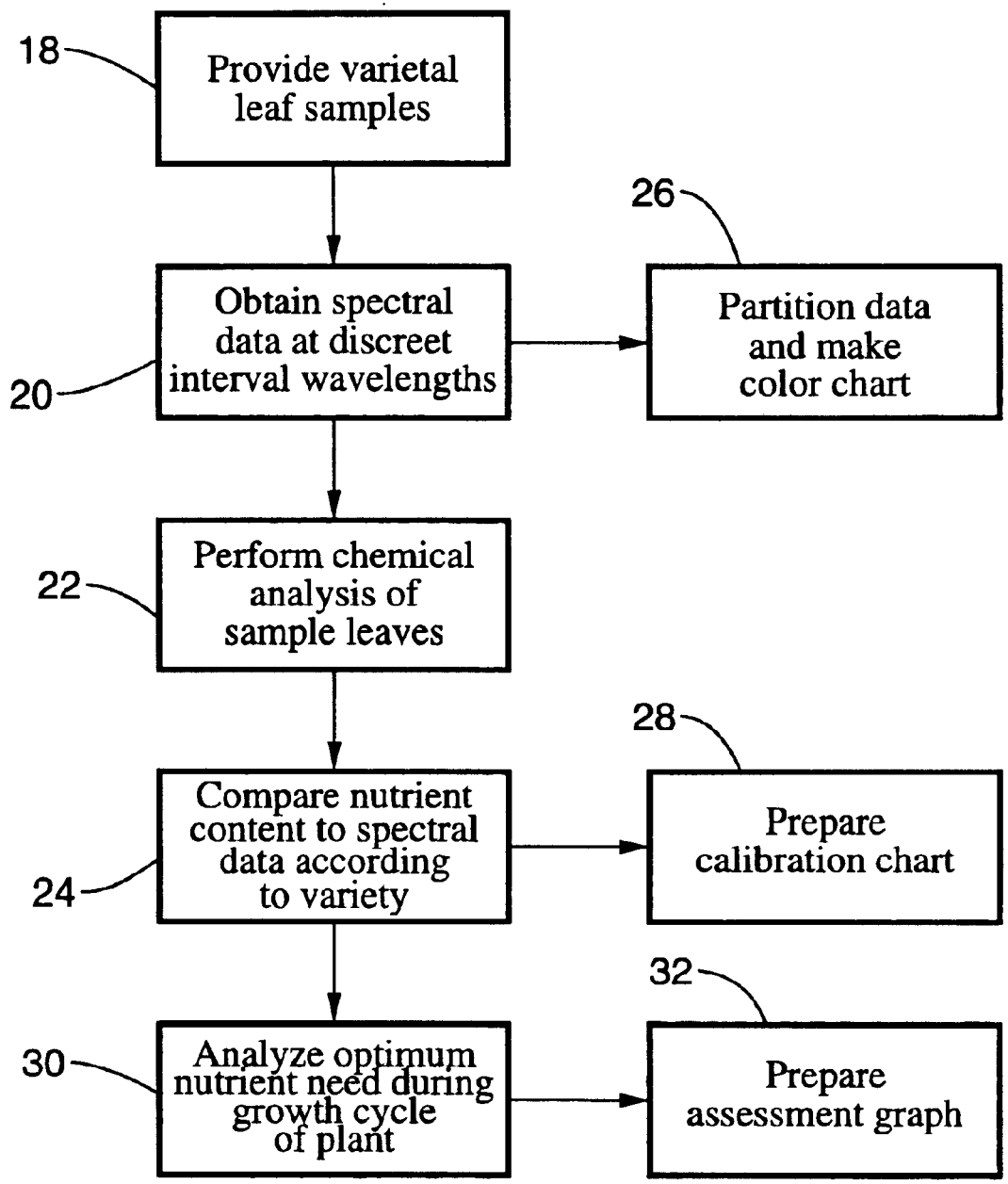
FIG. 3 is a block diagram showing the preferred process for defining the colors for the leaf color chart, calibration chart and assessment graph according to the present invention.

Turning now to the block diagram of FIG. 3, the first step 18 for preparation of the leaf color chart is to provide leaf samples at various nitrogen or other nutrient levels. For purposes of illustration and not of limitation, eight varieties of rice plant were selected for nitrogen analysis. The most recently expanded leaf (referred to as the Y leaf) was chosen for spectral analysis. The Y leaf is preferred since it is the youngest fully developed leaf and it is relatively pristine, in that there is normally no insect, disease, photooxidation, and weather damage on the leaf. Therefore, the color is a true representation of internal nitrogen level and is a reliable predictor of whole plant nitrogen status. In addition, the Y leaf visually dominates the upper canopy and therefore, this leaf heavily influences the color of the "whole field." It is also the leaf that is typically sampled for chemical analysis.

Leaves are preferably sampled at panicle initiation (onset of the reproductive phase) since it is the stage of plant development most sensitive to nitrogen deficiency and the time when farmers are likely to add additional fertilizer. Additionally, leaf color remains relatively stable from the growth stage of maximum tillering and heading. Thus, leaf colors from maximum tiller stage to early boot stage are consistent.

Once rice leaves are picked they quickly dehydrate and roll-up along the length of the leaf resulting in a change of leaf color. Because present spectrophotometric instrumentation is not field durable, the harvested leaves are preferably preserved during transport to the laboratory. It is preferred that whole plants be dug up and immediately placed in a water filled container. This procedure will prevent dehydration and allow sampling of leaves at various locations in the canopy (i.e. age) to check for consistency of color and nitrogen content over a range of leaf ages of the subject plant.

Referring now to block 20 of FIG. 3, spectrophotometer data are obtained at preferably 10 nm intervals in the visible spectrum from approximately 400 nm to 700 nm. Reflectance readings are preferably taken at approximately 6 inches (~15 cm) from the tip of the leaf. Rice leaves expand during growth from the base. Therefore the newest cells are at the base of the leaf and the oldest at the leaf tip. Leaf cells at the base of the leaf are still expanding and do not yet have a full complement of chlorophyll due to age and lack of light.

In contrast, cells at the tip of the leaf may be necrotic due to saline conditions, herbicide injury, or pest pressure. Accordingly, tissue at around six inches from the tip of the leaf should be fully mature and free from lesions, which may affect the reflectance measurements.

The leaf samples are preferably presented to the spectrophotometer instrument mounted on a white background. A white light reflecting background is preferred because better color and range separation between leaves with contrasting levels of nitrogen (and greenness) is possible than with a black background.

A spectrophotometer such as model CM-3700d manufactured by Minolta Co. Ltd. or other suitable device may be used to obtain reflectance values at ten nanometer increments across the range of visible light. The reflectance values are then preferably plotted. Thus, the individual spectral signature of a plant can be quantified, and therefore reproduced in a consistent manner.

Analysis of the acquired spectrophotometric data may show relationships between the color variables and leaf nitrogen depending on the type of plant involved. With rice, analyses of the spectral reflectance data indicated that (L*) and (b*) were most variable across a range of leaf color, with (b+) showing the greatest incremental change in relation to leaf nitrogen. Both were highly correlated ($R^2>0.90$) with leaf tissue nitrogen. The slope of (b+) in relation to incremental changes in leaf nitrogen was the greatest among the three-color variables (i.e. the most sensitive to changes in leaf nitrogen). Thus, the b+ variable from the suite of color descriptors was observed to be highly correlated to leaf nitrogen.

The colors for the color chart may be derived by sampling one variety of plant at varying nitrogen levels or derived from as a composite of data from several varieties of a plant in the alternative.

For example, in one embodiment eight public rice varieties (M-202, M-205, M-103, S-201, L-204, L-205, Calhikari, and Calmati) were grown under six pre-plant applied nitrogen levels (0, 40, 80, 120, 160, and 200 lb/acre). Field preparation and management followed standard grower practices. Thirty Y-leaves from all varieties, nitrogen levels, and experimental replicates (4) were sampled at panicle initiation and the spectral reflectance of the individual leaves with the spectrophotometer (30×6×8×4=5760 leaves) was obtained. Reflectance values for each variety were partitioned according to (b+) values into eight discrete ranges, which correspond to the individual color panels of the leaf color chart of the present invention.

Accordingly, once the L*, a*, and b* values for each of the preferred number of color panels is gathered, the data is processed and mean data for each sample interval can be used to fabricate a leaf color chart and to determine the appropriate combination of pigments needed to reproduce the color in plastic, paint or the like. As shown in block 26 of FIG. 3, a color chart is prepared that accurately displays the same spectral reflectance as shown by the subject plant leaves. Therefore, the fabricated color chips are preferably tested for color quality and spectral reflectance.

The sample leaves then undergo chemical analysis to determine the nitrogen content of the leaves as shown in block 22 of FIG. 3. Sample collection and analysis preferably begins with choosing the darkest green and lightest green rice or other plant leaves that can be found. These samples set the lower and upper limit for (b+) values. Sample bags may then be labeled by individual increments of (b+) from 20 to 41 (<20; >20 to 23;>23 to 26;>26 to 29;>29 to 32;>32 to 35;>35 to 38;<38 to 41) for example.

Leaves are preferably picked, analyzed by the colorimeter and placed in the appropriate sample bag determined by the analyzed (b+) value. These segregated samples are then chemically analyzed for nitrogen content as shown in block 22 of FIG. 3. Near parallel regression lines relating (b+) to % N are typically observed for all rice grain types. Regression analyses relating color to % nitrogen revealed that medium and long grain varieties could be described by one equation ($Y=0.1435X+7.9745$) and remain within the range of sampling error. Short grain varieties required a unique, yet near parallel predictive model ($Y=0.1169X+6.7845$). Regression models have shown that the leaf color chart panels corresponded to a range of leaf nitrogen of 1.5% to 5.0%.

In block 24 of FIG. 3, the nitrogen or other nutrient content is compared to the spectral values according to plant variety. Thus, a set of paired samples relating (b+) to nitrogen for each variety over a wide range of leaf color can be generated. The (L*) and (a*) values associated with their respective (b+) values of each leaf can be retained in the data set, i.e. a suite of (L*), (a*) and (b*) values describing leaf color for each of the eight discrete cells. The nitrogen content of the leaf and spectral signature (color) within the visible light spectrum of each of the eight cells is unique, quantifiable and reproducible.

The comparison and correlation of spectral data and nutrient content in block 24 of FIG. 3 by variety of plant is made into a calibration chart as shown in block 28 of FIG. 3. The calibration table is constructed with the results of the chemical analysis procedure of block 22 of FIG. 3 and the spectral data of block 20 of FIG. 3 as described above. The calibration table preferably comprises an array of nutrient level entries, the columns of which are indexed according to a unique identifying number associated with each color cell and the rows of which are indexed by the variety of rice or other plant type.

The variation in leaf nitrogen between varieties of rice having the same matching color panel is shown in one embodiment of the calibration chart shown in Table 1. For example, there is over a full percentage point difference between the nitrogen level of the L205 (3.9) and Akita (5.0) varieties with leaves matching color panel 8. It can be seen that the calibration chart can include any number of plant varieties that are desired. Alternatively, the calibration chart could generalize the varieties into medium, long and short grain varieties.

The nitrogen percentage of leaves exhibiting intermediate values between cell colors can also be calibrated by choosing a value between the chart entries for the closest consecutive cell numbers. For example, a L205leaf that has color value between cell four and cell five would provide an approximate nitrogen value of (2.9), which is a value between the chart value of (2.7) for cell four and (3.1) for cell five. Since leaf nitrogen percentages can vary significantly between varieties exhibiting the same leaf color the amount of nitrogen needed to increase tissue concentrations to an optimum level also can vary between varieties. It is therefore essential to accurately identify the nitrogen content of the test leaf. Similar approximations are conducted with charts for nutrients other than nitrogen.

Leaf nitrogen content also varies throughout the growing season. In block 30, of FIG. 3, the optimum nitrogen need during each stage of the growth cycle of the plant is analyzed. The variation of leaf nitrogen content of a particular variety of plant during each stage of the growing cycle will be consistent with each variety. Optimum leaf nitrogen content and nutrient need evaluations for a particular plant variety is within the capability of those of ordinary skill in the art.

Finally, as shown in block 32 of FIG. 3, an assessment chart is prepared. The assessment chart comprises a graph of nutrient status based on the leaf nutrient level value derived from the calibration chart compared to the plant growth stage for the subject plant variety. In the example shown, various color shades on the chart indicate the nitrogen status of the crop, as being adequate, critical, deficient, or excessive. The assessment chart allows the grower to determine the need for additional or reduced amounts of fertilizer to be applied to the field.

Figure 4:
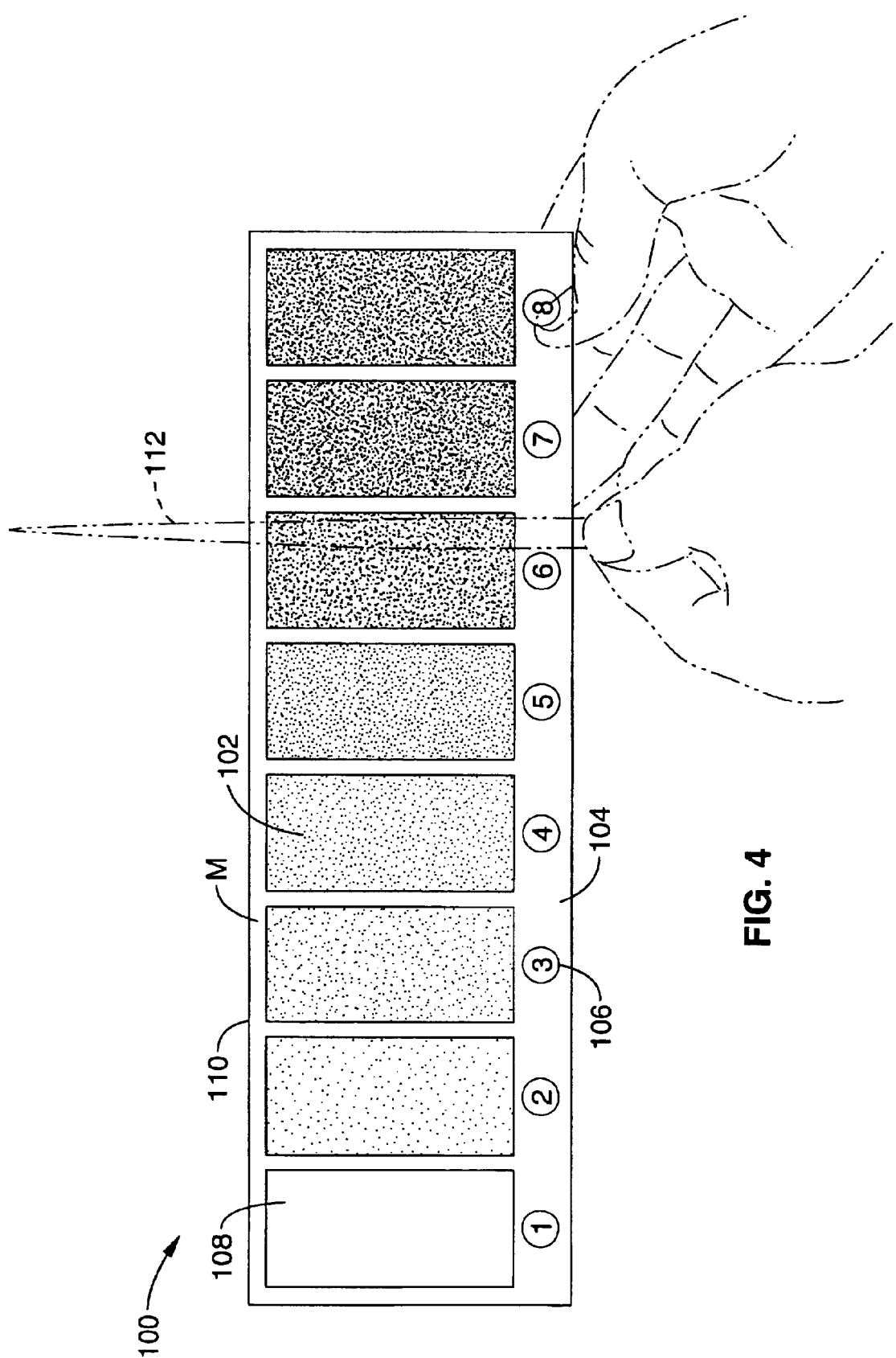
FIG. 4 is a representation of a leaf color chart according to one embodiment of the present invention having eight color cells.

Referring now to FIG. 4, one embodiment of the leaf color chart 100 is shown in use. The leaf color chart 100 has a number of color panels or cells 102 that are mounted to a planar, rectangular, plastic support structure 104. The support structure 104 is preferably injection molded of durable, high impact, high temperature plastic. The color of support structure 104 is preferably a neutral gray color in order to reduce any interference in color matching.

Each of the cells 102 is a different shade of green that is correlated to the nitrogen content of a plant that has been developed through careful examination of spectral characteristics of the plant as described previously. The color cells 102 have been configured to have virtually the same spectral reflectance characteristics as observed in the subject plants. Each of the cells 102 is preferably given a number 106 that identifies the cell 102. Optionally, ribbing 108 may be added to the surface of individual color cells 102 in order to reduce glare during use.

A marginal portion M along the longitudinal edge 110 of the plastic color chart has been removed to facilitate direct visual comparison between the whole crop and the color panels 102.

In use, leaf color chart 100 may be used to match the color of a single leaf 112 or of a whole field. With the single leaf method of matching, the single Y-leaf 112 is preferably aligned and matched with the cell 102 that most closely matches the color of the leaf and color number 106 is noted. Alternatively, with the whole field method, the user is positioned with the sun at the back and looks directly across the top 110 of the leaf color chart to match the color of the whole field. The number 106 of the matching cell 102 is noted for further reference.

The percentage of nitrogen or other nutrient is then determined from a calibration table once the color panel number 106 has been determined. The calibration table is a comparison of the nitrogen percent observed in specific varieties of plants at the incremental colors represented by the color cells 102. Thus, a nitrogen percentage is obtained by finding the number from the color chart and the variety of the plant on the other coordinate. If a color value that is in between the colors of the cells 102 are observed, the nitrogen percent may be determined by approximating an intermediate value between the given values in the calibration table.

Figure 5:
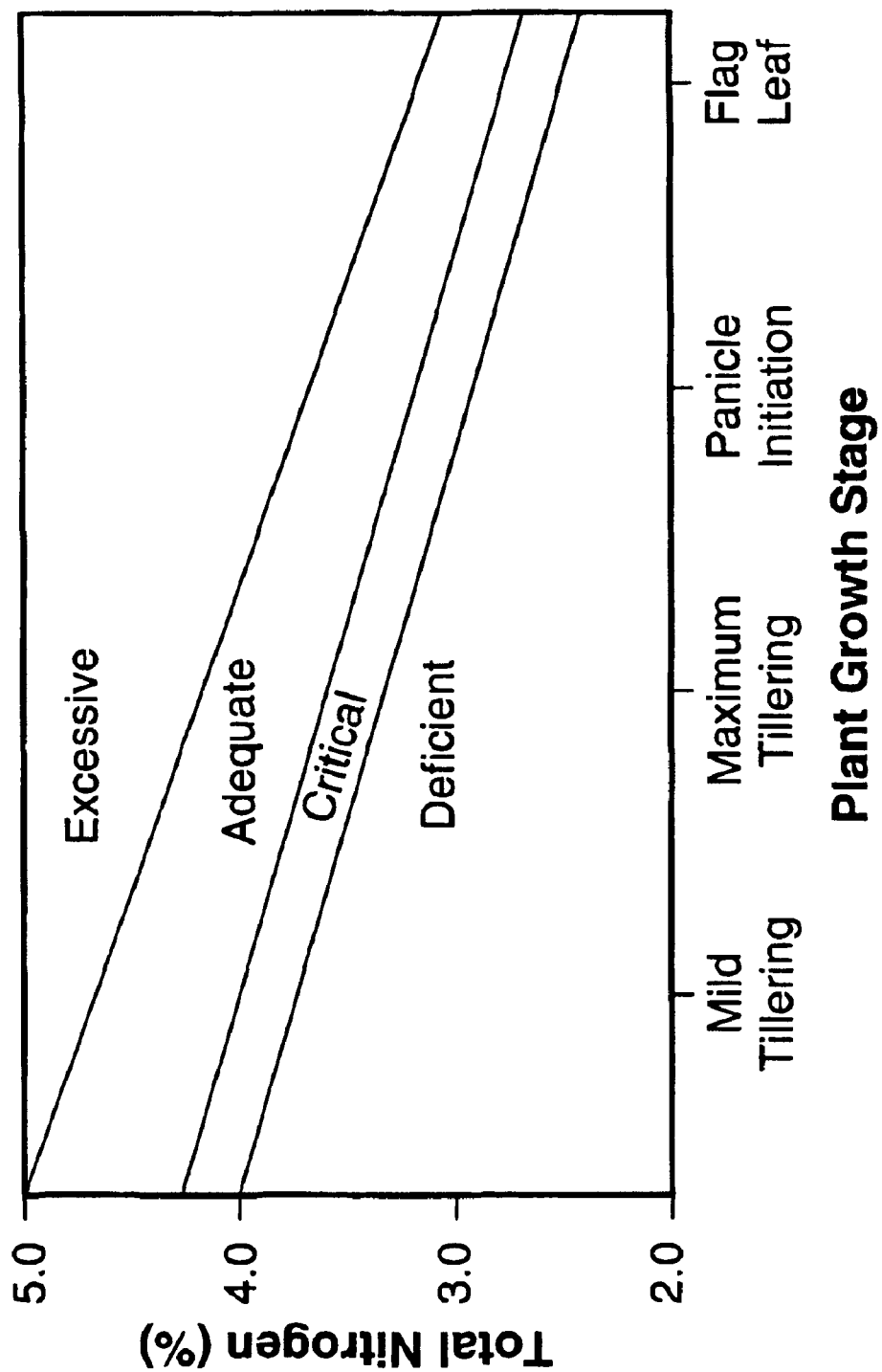
FIG. 5 is a graph comparing total percent nitrogen with growth stage allowing an assessment as adequate, critical, deficient or excessive according to the present invention.

Turning now to FIG. 5, a nitrogen need assessment is then preferably conducted with the aid of an assessment chart as shown. Use of the calibration chart provides a leaf nitrogen level value in percent. The calibrated N% value is compared with the current stage of the test leaf in the growing cycle to make a nitrogen assessment of deficient, critical, adequate and excessive.

The assessment chart takes the stage of the subject of the growth cycle into account when assessing the need for nitrogen or other nutrient in the plant. For example, a nitrogen percentage of 3.0 from the calibration chart would be assessed as deficient if the plant is in the mid-tillering stage and adequate if the plant is in the flag leaf stage.

Alternatively, the assessment chart may take the form of a table. For example in FIG. 6, the critical and adequate ranges of total leaf nitrogen are provided according to the plant growth stages. Calibrated % N values that are outside the ranges of the table are determined to be deficient if below the ranges set for the in the table or excessive if above. Growth stages are also described in days after planting for vary early, early and late varieties of rice as a reference in FIG. 6. The assessment information can be used for making management decisions with respect to the quantity and timing of the application of fertilizers based on the need of a specific variety of crop and the position in the growth cycle. The crop assessment can be conducted daily in the field and analysis provided within minutes at virtually no cost.

The amount and composition of the fertilizer to be applied can be readily determined with the method resulting in a reduction of nitrogen loss and fertilizer waste. The precise management of crop nutrients leads to greater yields and farm profitability, particularly for the third world farmer that does not have access to expensive sophisticated machines that are eliminated by these methods.

Accordingly, it will be seen that this invention provides a simple and effective way of assessing the need of nitrogen or other nutrient for a particular crop that can be conducted daily that is inexpensive to use and provides accurate results in real time.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Percent Nitrogen of Leaves Selected by the Leaf Color Chart

| Variety | Leaf Color Chart Panel Number | | | | | | | |
|---|---|---|---|---|---|---|---|---|
| | 1 | 2 | 3 | 4 | 5 | 6 | 7 | 8 |
| L205 | 1.6 | 2.0 | 2.6 | 2.7 | 3.1 | 3.7 | 4.2 | 3.9 |
| M202 | 1.5 | 2.5 | 2.4 | 2.5 | 2.9 | 3.5 | 3.6 | 4.1 |
| M104 | | 2.0 | 2.5 | 2.6 | 3.0 | 3.6 | 4.3 | 4.5 |
| CH201 | 1.6 | 2.6 | 2.6 | 2.6 | 2.8 | 3.3 | 3.5 | 4.0 |
| M205 | | | 2.6 | 2.6 | 3.0 | 3.5 | 3.9 | 4.2 |
| CT201 | 2.0 | 2.8 | 2.8 | 2.8 | 3.1 | 3.6 | 4.3 | 4.1 |
| Akita | 2.0 | 2.1 | 2.2 | 2.3 | 3.0 | 4.0 | 4.4 | 5.0 |
| Koshi | 2.2 | 2.4 | 2.3 | 2.5 | 2.9 | 3.5 | 3.6 | 4.1 |

What is claimed is:

1. A leaf color chart, comprising:
    a planar, rectangular, plastic support structure; and
    a plurality of color panels carried by said support structure, each said color panel having a different shade of green, each said shade of green relative to nutrient content in a plant leaf;
    wherein the colors in said color panels are based on the spectral reflectance characteristics of said plant leaf at different nutrient states; and
    wherein said spectral reflectance characteristics comprise:
        (a) a luminescence designation taken from said plant leaf;
        (b) a red-green chromaticity designation taken from said leaf;
        (c) a yellow-blue chromaticity designation taken from said leaf; and
        (d) combining said luminescence, red-green and yellow-blue designations to define a color.

2. A leaf color chart as recited in claim 1, wherein said colors of said panels have a spectral profile, said spectral profile comprising reflectance values for a variety of a plant taken at incremental wavelengths within the range of visible light, said panel configured to have virtually the same spectral profile as the plant across the same range of visible light.

3. A leaf color chart, comprising:
    a planar, rectangular, plastic support structure; and
    a plurality of color panels carried by said support structure, each said color panel having a different shade of green, each said shade of green relative to nutrient content in a plant leaf;
    wherein said colors of said panels have a spectral profile, said spectral profile comprising reflectance values for a variety of a plant taken at incremental wavelengths within the range of visible light, said panel configured to have virtually the same spectral profile as the plant across the same range of visible light; and
    wherein said spectral profile of said panel comprises a set of reflectance values with a chromatic component in a red-green scale, a chromatic component in a yellow-blue scale and a luminescence component.

4. A leaf color chart as recited in claim 1 or 3, wherein the colors in said color panels are based on the spectral reflectance characteristics of said plant leaf at different nitrogen states.

5. A leaf color chart as recited in claim 1 or 3, wherein the colors in said color panels are based on the spectral reflectance characteristics of said plant leaf at different phosphorous states.

6. A leaf color chart as recited in claim 1 or 3, wherein the colors in said color panels are based on the spectral reflectance characteristics of said plant leaf at different potassium states.

7. A leaf color chart as recited in claim 1 or 3, wherein the colors in said color panels are based on the spectral reflectance characteristics of said plant leaf at different magnesium states.

8. A leaf color chart as recited in claim 1 or 3, wherein said colors of said panels are selected by partitioning the blue-yellow spectral scale into a plurality of discreet ranges, each panel of said chart having a reflectance corresponding to one of said ranges.

9. A leaf color chart as recited in claim 1 or 3, wherein the colors of said color panels are based on the (b+) spectral reflectance characteristics of said plant leaf at different nitrogen states.

10. A system for determining nitrogen status of plants, comprising:
   (a) a leaf color chart having a plurality of color panels, each color panel having a different shade of green;
   (b) a calibration table comprising an array of nutrient level entries, said table having a plurality of columns indexed according to an identifying number associated with each said color panel, said table having a plurality of rows indexed by the variety of plant, wherein said table provides a leaf nutrient level value in percent; and
   (c) an assessment chart comprising a graph of nutrient status based on the leaf nutrient level value derived from said calibration table compared to the plant growth stage for a plurality of varieties of plants, said assessment chart having a plurality of colored regions indicative of the nutrient status of the plants, as being adequate, critical, deficient, or excessive.

11. A system for determining nutrient status of a plant as recited in claim 10, wherein the colors in said color panels of said leaf color chart are based on the spectral reflectance characteristics of a plant leaf at different nitrogen states.

12. A system for determining nutrient status of a plant as recited in claim 11, wherein the colors of said color panels of said leaf color chart are based on the (b+) spectral reflectance characteristics of a plant leaf at different nitrogen states.

13. A system for determining nutrient status of a plant as recited in claim 10, wherein the colors in said color panels of said leaf color chart are based on the spectral reflectance characteristics of a plant leaf at different potassium states.

14. A system for determining nutrient status of a plant as recited in claim 10, wherein the colors in said color panels of said leaf color chart are based on the spectral reflectance characteristics of a plant leaf at different phosphorous states.

15. A system for determining nutrient status of a plant as recited in claim 10, wherein the colors in said color panels of said leaf color chart are based on the spectral reflectance characteristics of a plant leaf at different magnesium states.

16. A system for determining nutrient status of a plant as recited in claim 10, wherein the nutrient level entries in said calibration chart are based on observed nitrogen levels of a particular plant variety in plant leaves exhibiting a characteristic color.

17. A system for determining nutrient status of a plant as recited in claim 10, wherein the nutrient level entries in said calibration chart are based on observed phosphorous levels of a particular plant variety in plant leaves exhibiting a characteristic color.

18. A system for determining nutrient status of a plant as recited in claim 10, wherein the nutrient level entries in said calibration chart are based on observed potassium levels of a particular plant variety in plant leaves exhibiting a characteristic color.

19. A system for determining nutrient status of a plant as recited in claim 10, wherein the nutrient level entries in said calibration chart are based on observed magnesium levels of a particular plant variety in plant leaves exhibiting a characteristic color.

20. A method for determining nutrient status of plants, comprising:
   comparing a plant leaf to a color panel on a leaf color chart having a plurality of color panels, each color panel having a different shade of green, each color panel having a identifying number;
   selecting the identifying number on said leaf color chart associated with the color panel most closely matching the color of said plant leaf,
   correlating said selected identifying number with a calibration table and selecting a corresponding nutrient level based on said correlation; and
   correlating said nutrient level with an assessment chart and selecting a corresponding nutrient status based on said correlation.

21. A method as recited in claim 20, wherein said calibration table comprises an array of nitrogen level entries, said table having a plurality of columns indexed according to said identifying numbers on said leaf color chart, said table having a plurality of rows indexed by a variety of plant, wherein said table provides a leaf nitrogen level value in percent.

22. A method as recited in claim 20, wherein said assessment chart comprises a graph of nitrogen status based on the leaf nitrogen level value derived from said calibration table compared to the plant growth stage for a plurality of varieties of plant, said assessment chart having a plurality of colored regions indicative of the nitrogen status of the plants, as being adequate, critical, deficient, or excessive.

23. A method as recited in claim 22, further comprising the steps of:
   correlating said selected identifying number with a calibration table and selecting a corresponding phosphorous level based on said correlation; and
   correlating said phosphorous level with an assessment chart and selecting a corresponding phosphorous status based on said correlation.

24. A method as recited in claim 22, further comprising the steps of:
   correlating said selected identifying number with a calibration table and selecting a corresponding potassium level based on said correlation; and
   correlating said potassium level with an assessment chart and selecting a corresponding potassium status based on said correlation.

25. A method as recited in claim 22, further comprising the steps of:
   correlating said selected identifying number with a calibration table and selecting a corresponding magnesium level based on said correlation; and correlating said magnesium level with an assessment chart and selecting a corresponding magnesium status based on said correlation.

26. A method as recited in claim 20, wherein said leaf comparing step comprises comparing the color of the whole field with the color panels of a leaf color chart.

27. A method for determining the colors of a sample comparison color chart, comprising:

providing plant samples from plants at a range of nutrient states, said nutrient states ranging from a deficient state to an excessive nutrient state;

analyzing the spectral reflectance characteristics of said leaf samples within each range of said nutrient states;

determining which of said reflectance characteristics is the most sensitive to change over the whole range of nutrient states;

grading the colors of a color chart according to the characteristic found to be most sensitive to a nutrient state change; and assigning a color value for each graded color that can be reproduced and made into a color panel;

wherein said reflectance characteristics comprise a luminescence variable, a red-green chromaticity variable, and a yellow-blue chromaticity variable.

28. A method as recited in claim 27, wherein said colors are graded according to the yellow-blue chromaticity reflectance characteristic.

29. A method as recited in claim 27, wherein the colors of said colors panels are graded on the (b+) spectral reflectance characteristics of said plant leaves at different nitrogen states.

30. A method as recited in claim 27, said method further comprising:

(a) obtaining spectral reflectance characteristics of a plant at a plurality of wavelength intervals between approximately 400 nm and approximately 700 nm to create a plant spectral profile; and (b) fabricating a color panel with an assigned color that exhibits approximately the same spectral profile as obtained from said plant.

* * * * *